(12) United States Patent
Ketting et al.

(10) Patent No.: US 6,450,594 B1
(45) Date of Patent: Sep. 17, 2002

(54) HINGE ASSEMBLY FOR VEHICLE TRACKS AND THE LIKE

(75) Inventors: Michael Ketting, Ennepetal; Mathias Woydt, Berlin; Jürgen Tomaszewski, Langenfeld; Christoph Pietzsch, Lengenfeld, all of (DE)

(73) Assignee: Intertractor GmbH, Gevelsberg (DE)

( * ) Notice: Subject to any disclaimer, the term of this patent is extended or adjusted under 35 U.S.C. 154(b) by 0 days.

(21) Appl. No.: 09/605,062

(22) Filed: Jun. 28, 2000

(30) Foreign Application Priority Data

Jun. 29, 1999 (DE) .......................... 199 29 961

(51) Int. Cl.[7] .............................................. B62D 55/12
(52) U.S. Cl. ...................................................... 305/203
(58) Field of Search ................................. 305/202, 203, 305/204, 59

(56) References Cited

U.S. PATENT DOCUMENTS

| 4,438,981 A | * | 3/1984 | Harms | 305/59 |
|---|---|---|---|---|
| 4,461,488 A | | 7/1984 | Harms et al. | 305/202 |
| 4,612,346 A | * | 9/1986 | Chiba | 525/66 |
| 4,735,465 A | * | 4/1988 | Weisner et al. | 305/203 |
| 4,847,135 A | * | 7/1989 | Braus et al. | 428/138 |
| 5,172,965 A | * | 12/1992 | Taft | 305/202 |
| 5,971,617 A | * | 10/1999 | Woelki et al. | 384/295 |
| 6,045,200 A | * | 4/2000 | Anderton et al. | 305/203 X |

FOREIGN PATENT DOCUMENTS

DE          31 27 104          1/1983

* cited by examiner

Primary Examiner—Russell D. Stormer
(74) Attorney, Agent, or Firm—Herbert Dubno

(57) ABSTRACT

A hinge assembly for a vehicle track, conveyor chain or the like has at least one bearing lacquer coated onto at least one of the mutually contacting surfaces of the pin or bushing and having a binder or carrier of the polyamide/polyimide type or of a molecular structure with alternating amide and imide monomers. A filler of molybdenum disulfide, molybdenum oxides and/or hydroxides and graphite is provided in the carrier or binder. Other lubrication is not required and the bearing lacquer has a long life.

19 Claims, 2 Drawing Sheets

HINGE ASSEMBLY FOR VEHICLE TRACKS AND THE LIKE

FIELD OF THE INVENTION

Our present invention relates to a track assembly for vehicle tracks and, more particularly to tracks for track vehicles such as construction vehicles, earth moving vehicles and special purpose vehicles. The invention also relates to hinge assemblies for track-like chains, for example conveyor chains and chains used for other purposes.

BACKGROUND OF THE INVENTION

Hinge assemblies are provided in vehicle tracks, conveyor chains and the like and can comprise a chain sleeve, a pin extending through this sleeve and having an end projecting beyond the sleeve and two chain bodies which are linked together by the pin and sleeve, including an inner-lying chain member or link which is pressed onto the sleeve and an outer lying chain body or link which is pressed onto the axially projecting end of the pin.

Such chains are widely used in the art and at the hinges of the chain formed between the pin and the bushing, a friction system is provided at which line contact develops between the inner side of the sleeve and the outer side of the pin received therein.

To reduce the friction and thus reduce adhesive wear and minimize the overall wear which can lead to chain lengthening and which can increase the life of the chain or link assemblies, the hinge joints in the past have been fabricated in closed systems with grease or oil containing additives which limit corrosion, increase lubricant life, etc.

Such lubrication systems require seals to prevent leakage of the lubricant from the contact regions between the pin and the sleeve and to prevent entry of foreign particles into the region of contact. For this purpose sealing rings, for example of polyurethane, can be used to seal the oil-filled or grease-filled elements against the exterior. Abrasive wear at the sealing rings can result in failure. A chain utilizing these principles is described for example in DE 31 27 104 C2.

In practice it has been found that such chains, because of the need for grease or oil reservoirs, usually in the form of bores or hollows in the pins, because of the need for a capability of refilling the reservoir and because of the seal arrangement are expensive and difficult or costly to maintain. The use of such tracks for track vehicles operating on sandy soils are especially a problem since the seals are readily damaged by abrasive sand. There is a substantial danger that lubricants which are contaminants for water supplies may leak into the environment.

OBJECTS OF THE INVENTION

It is, therefore, the principal object of the present invention to provide a chain, track for a tracked vehicle or hinge assembly for a tracked vehicle or a conveyor which can be fabricated less expensively than heretofore with a greater useful life, even in abrasive media such as a sandy environment and which also requires significantly less maintenance than has heretofore been the case.

Another object of this invention is to provide an improved hinged assembly for a tracked vehicle or conveyor whereby drawbacks of prior art systems are avoided.

A further object of the invention is to provide an improved method for reducing wear of a hinged assembly for the purposes described and to provide a new use for a wear resistant lacquer composition which is capable of eliminating the need for lubricant reservoirs, seals or the like in hinge assemblies for a tracked vehicle or conveyor.

SUMMARY OF THE INVENTION

These objects are attained, in accordance with the invention by providing the surface of the chain pin, or the inner surface of the chain bushing or sleeve surrounding same, at least in a region in which these surfaces can come into contact with one another during articulation or hinge action, or both of these surfaces, with a wear resistant or antifriction lacquer to form a coating in which the binder or carrier is composed of a synthetic resin on a polyamide-polyimide basis or of a molecular structure comprised of amide-imide monomers and with which molybdenum disulfide ($MoS_2$) and/or oxide or hydroxide compounds of molybdenum or mixtures thereof with graphite can be admixed to the polymeric carrier or binder. The molybdenum antifriction composition, including graphite, can be referred to herein as a filler.

More particularly, a hinge assembly for a track vehicle or conveyor can comprise: a sleeve, a pin traversing the sleeve and respective bodies articulated together by the pin and the sleeve and respectively mounted on the pin and the sleeve, the pin extending axially beyond the sleeve and the bodies including an outer body pressed onto an end of the pin projecting beyond the sleeve and an inner body pressed onto the sleeve, the pin having an outer surface juxtaposed with an inner surface of the sleeve and adapted to contact the inner surface at least over portions of the inner and outer surfaces during mutual articulation of the bodies, at least one of the surfaces being coated at least over the portion thereof with a bearing lacquer composed essentially of a polyamide/polyimide synthetic resin carrier or binder or a synthetic resin carrier or binder with a molecular structure containing amide and imide monomers, and an additive contained therein and selected from the group which consists of molybdenum disulfide, oxides and hydroxide compounds of molybdenum, mixtures thereof, and mixtures thereof with graphite.

Preferably the binder or carrier is comprised of a molecular structure with alternating amide-imide monomers.

To improve the adhesion between the antifriction lacquer or bearing lacquer and the surface of the pin and/or bushing or sleeve to which it is applied, the surface to which the lacquer is applied is provided with a primer, preferably in the form of a phosphatization layer, the phosphatization layer being coated in turn with the bearing lacquer.

Alternatively or additionally, the coated surface can be roughed and the bearing lacquer applied to the roughened surface. The surface roughness depth $R_a$ imported to the bushing or pin can approximate 0.5 $\mu$m. The overall roughness for a drawn tube which can be cut transversely to provide the bushing or sleeve can amount to $R_a$ of about 1.5 to 2 $\mu$m and the interior of the bushing can retain this roughness to facilitate adhesion of the coating.

Preferably the bearing lacquer contains 15 to 30 volume percent molybdenum disulfide, 3 to 20 volume percent graphite and molybdenum oxides and/or hydroxides as described below. A particularly advantageous bearing lacquer contains 20–25 volume percent molybdenum disulfide and 4–6 volume percent graphite.

The bearing lacquer can be burned onto or baked onto the surfaces of the pin and/or bushing and preferably with a baking temperature of about 200° C. and a duration of about one hour.

The bearing lacquer can be applied in a thickness of about 10–20 $\mu$m and can be a single layer but preferably is comprised of a plurality of layers separately applied and dried or baked with each layer having a thickness of 7 to 10 μm. In the most advantageous state, the bearing lacquer is comprised of two layers.

According to a feature of the invention the filler or molybdenum solids contained in the bearing lacquer from at least one compound selected from the group which consists of crystalline molybdenum hydroxide monohydrate and molybdenum oxide dihydrate of the formula $MoOO_3 \cdot nH_2O$, where n=1 or 2 and compounds of that formula wherein a part of the $H_2O$ molecules are octahedrally coordinated in layers of $\{MoOO_{4/2}(OH_2)\}_n$, and compounds containing ilsemannite $Mo_3O_8 \times H_2O$.

Preferably the lacquer contains substoichiometric molybdenum oxide forming Magnéli phases of the formula $Mo_nO_{3n-1}$ where n>4 with the defects appearing in the (102) or (103) crystallographic planes.

The hinge assembly of the invention can operate without lubricants in the form of grease or oil and therefore needs no lubricant reservoir or any facility to refill the reservoir with lubricant. Sealing rings are unnecessary although obviously it is advantageous to avoid the entry of abrasive media into the contact regions of the hinge assembly and this can be achieved with the system of the invention utilizing seals for example as described in the aforementioned German Patent Document to prevent the incursion of sand or the like (see also U. S. Pat. No. 4,461,488).

It has been found that the presence of say 20 to 25 volume percent molybdenum disulfide in the bearing lacquer will protect the contact surfaces of the pin and sleeve against adhesive friction and the damage that can cause. The additional presence of 10 to 20 volume percent graphite and preferably 4–6 volume percent graphite in a particle size of 1–15 μm, further reduces any tendency frictional interaction between the contacting surfaces. The bearing lacquer is capable of withstanding extremely high loads which can be attributed to both the molybdenum disulfide and the carrier or binders used. Apparently after application of the lacquer and a short running time, the molybdenum disulfide particle orient themselves in the bearing lacquer film so as to minimize wear between the surfaces and damage to the film at high loads. This is especially important in construction machinery operating at temperatures in the range of −40° C. to 150° C. Under these circumstances, coefficients of friction in the range of less than 0.1 can be noted.

Even with abrasive Arizona sand or Turkish sand, the friction coefficient increases to a maximum of 0.8 with the system.

By contrast with greases, whose viscosity is highly dependent upon the temperature and thus make the mixed friction coefficient temperature dependent, the friction coefficient of the bearing lacquer of the invention is practically unaffected by temperature, especially in the winter.

Tests have shown that for a heat hardened bearing lacquer layer with the preferred composition of molybdenum disulfide and graphite, the film life is not reduced even in environments utilizing fine Arizona or Turkish sand. Apparently the abrasive particles become embedded in the lacquer layer without effecting the sliding characteristics thereof. It has been found that this embedding characteristic is only obtained with carriers and binders in accordance with the present invention.

Tests indicate film lives of 300,000 to in excess of 1 million cycles. One cycle corresponds to a displacement of about 10 meters travel in a D6-Dozer with a track chain having 44 links. The typical cycle number by a dozer is usually $n < 2.5 \times 10^6$ and with an excavator n<400,000.

In addition, a chain equipped with hinge assemblies according to the invention is practically noiseless and free from significant noise generation in the hinge assemblies both at high and low temperatures. This is especially the case when both of the contact surfaces are double coated with each individual coating layer having a thickness of about 7–8 μm. The result chains have exceptionally high cycle numbers.

Since the run-in phase for the hinge assembly is especially short, the film adheres optimally to the substrate and has a maximum life. The preferred surface roughness is 0.5 μm and can be produced by sandblasting of the surface.

The hardening of the bearing lacquer can be effected economically by a heat treatment and, for example, the pins, upon manufacture can be briefly heated to a temperature of 200°–250° C. in an inductor for stress relief after quenching in production of the pins and for a period of 10–15 minutes. The bushing or sleeves can also be subjected to a stress relieving operation after the hardening. The brief stress relief step tends to reduce track formation.

The bearing lacquer is baked or burned onto the surface at a temperature usually from about 190° C. to about 220° C. This step can be combined with the brief stress relief step. In that case especially the pin must be finish machined before coating.

The filter in the bearing lacquer can also be composed of oxides and hydroxides of molybdenum in combination with graphite. Such compositions have especially effective operating durations.

Substoichiometric $MoO_3$ forms so-called "crystallographic-shear-structures" (CS-Structures) in which the point defects in the crystal condense to form planar defects. The planar defects can be an omitted plane (121-plane) in a triclinic lattice in which each nth oxygen plane is missing. The phases noted by Professor A. Magnéli referred to here as Magnéli phases, follow in the triclinic crystal system the pattern $(Ti,V)_nO_{2n-1}$, with $4 \leq n \leq 9$, or $(W,Mo)_nO_{3n-1}$ with $n \geq 4$. The defects, depending upon the cation being in the {121} or {132} and {102} planes (for example $MO_4O_{11}$ {12033-38-4} or $Mo_8O_{23}$ {12058-34-3} layer structures can also involve hydroxides of molybdenum like decamolybdate $MoO_{2.5}(OH)_{0.5}$ with hexagonal crystal structure. The crystalline monohydrate and dihydrate of molybdenum with the formula $MoO_3$ n $H_2O$ with n=1 or 2 are also known. In these compounds a part of the $H_2O$ molecule is coordinated with the molybdenum $\{MoOO_{4/2}(OH_2)\}_n$ octahedrally while the other part appears between the layers as the hydrate.

It has been found that a coating of the bearing lacquer which contains such oxide or hydroxide compounds of molybdenum has an especially long life.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
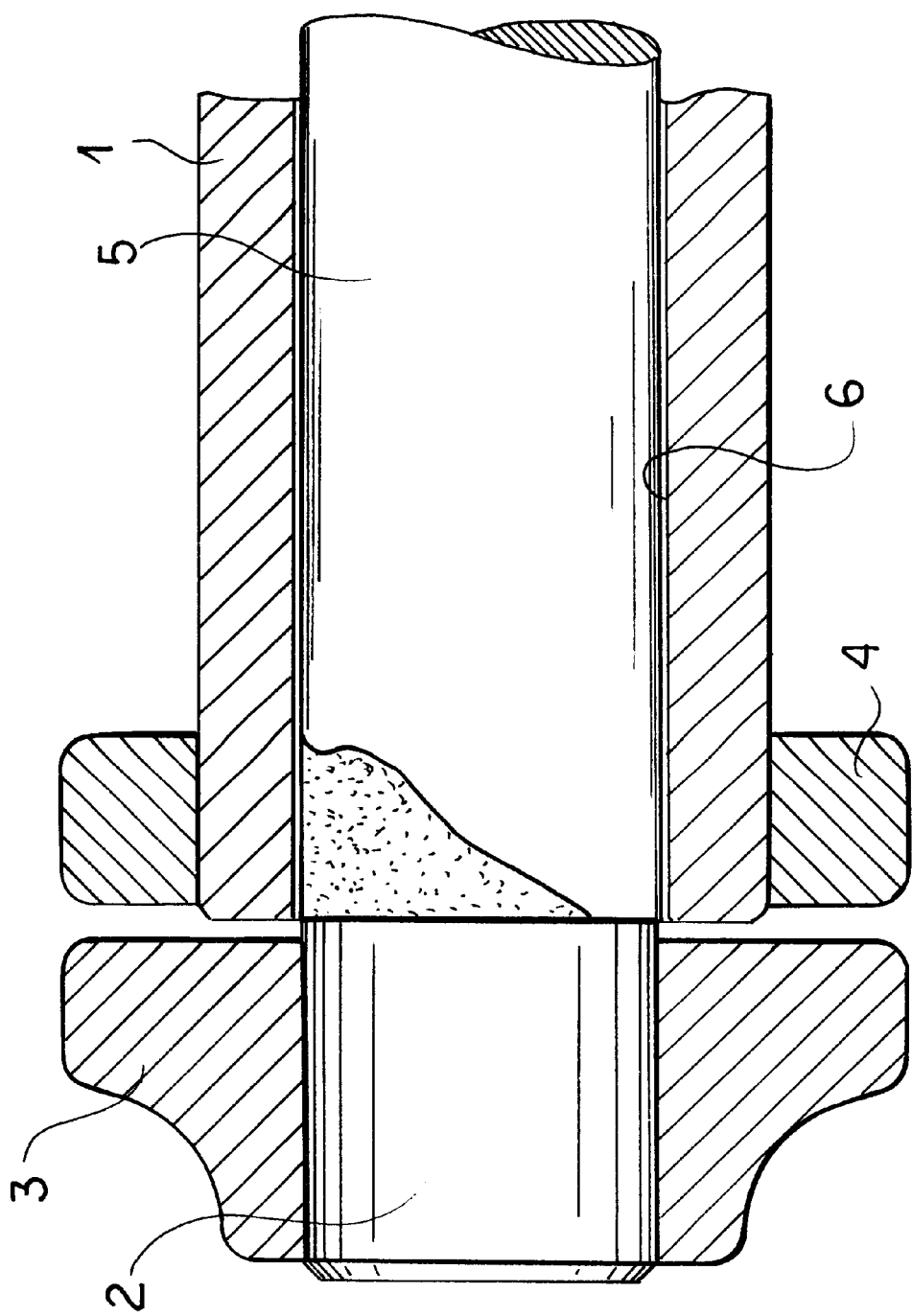
FIG. 1 is a cross sectional view through a hinge assembly for a track chain or conveyor according to the invention.

A track chain for construction vehicles, special purpose vehicles or other track laying vehicles and for conveyors or the like comprises, as shown in the drawing, a chain bushing 1, a chain pin 2 and an outer chain link 3 and an inner chain link 4 in the region of the hinge assembly. The inner member 4 is formed by offsetting inwardly a portion of the link, the opposite end of the link forming the outer link member for the next hinge assembly.

According to the invention, pin 2 projects beyond the bushing 1 and the inner link body 4 is pressed onto the sleeve or bushing 1 while the outer body or member 3 is pressed onto the free end of the pin 2. In the pressing regions, the surfaces of the bushing and pin are free from the coating.

Figure 2:
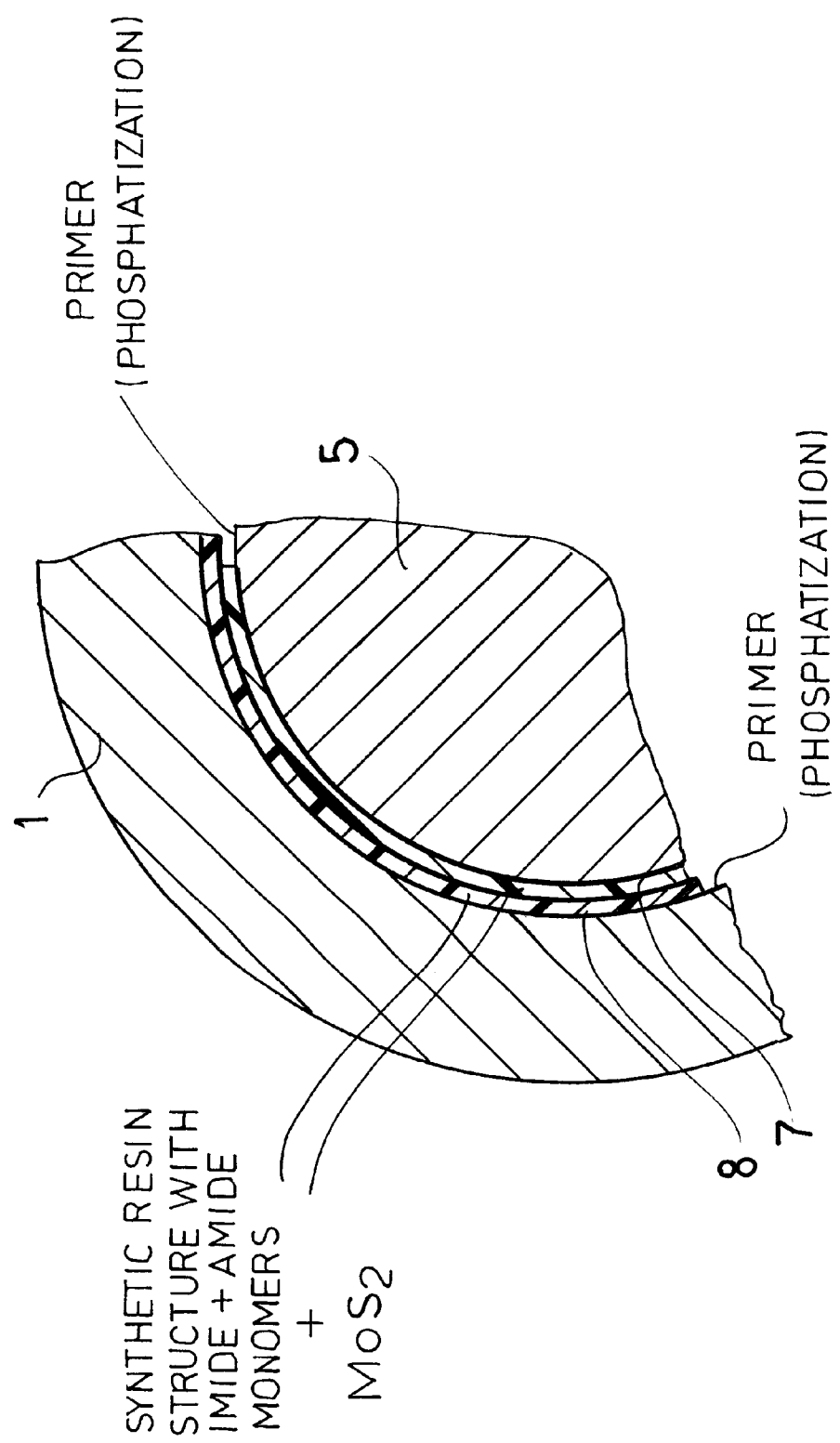
FIG. 2 is a cross section through the hinge assembly of FIG. 1 showing the inner and outer layer or layers containing the molybdenum compounds in an exaggerated thickness.

The outer surface 5 of the pin 2 and the inner surface 6 of the pin and bushing, where they contact upon articulation of the members 3 and 4, are coated with the bearing lacquer in layers 7 and 8 (FIG. 2) each of which may be made up of two layers. Each of these two layers can have a thickness of 7 to 8 $\mu$m and the coatings on each of the surfaces may have a thickness of say 14 to 16 $\mu$m. While two coatings have been shown in FIG. 2, it is of course, possible to operate with a single coating on one or the other of the mutually engaging surfaces of the bushing 1 and the pin 2.

The bearing layer is composed of a binder or carrier of a polyamide or polyimide synthetic resin or a synthetic resin with a molecular structure with alternating amide and imide monomers containing a filler which can consist of molybdenum disulfide and graphite, molybdenum disulfide, molybdenum oxide and/or hydroxides and graphite, molybdenum disulfide and oxides and/or hydroxides of molybdenum or oxides and hydroxides of molybdenum in admixture with graphite. A preferred composition includes 15 to 30 volume percent molybdenum disulfide and 4 to 6 volume percent graphite. The bearing layers are baked onto surfaces which have been sand blasted to a roughness Ra of about 0.5 $\mu$m. The result is a hinge joint for a conveyor or vehicle track chain which does not require grease or oil lubrication and even upon penetration of sand or other on materials into the joint does not show significant deterioration. The frictional wear is low or negligible and the joint has a high useful life.

We claim:

1. A hinge assembly for a tracked vehicle or a conveyor comprising a sleeve, a pin traversing said sleeve and respective bodies articulated together by said pin and said sleeve and respectively mounted on the pin and the sleeve, said pin extending axially beyond said sleeve and said bodies including an outer body pressed onto an end of said pin projecting beyond said sleeve and an inner body pressed onto said sleeve, said pin having an outer surface juxtaposed with an inner surface of said sleeve and adapted to contact said inner surface at least over portions of said inner and outer surfaces during mutual articulation of said bodies, at least one of said surfaces being coated at least over said portion thereof with a bearing lacquer composed essentially of a synthetic resin carrier or binder with a molecular structure containing amide and imide monomers, and an additive contained therein and selected from the group which consists of molybdenum disulfide, oxides and hydroxide compounds of molybdenum, mixtures thereof, and mixtures thereof with graphite.

2. The hinge assembly defined in claim 1 wherein said one of said surfaces is provided with a primer to said lacquer is applied.

3. The hinge assembly defined in claim 2 wherein said primer is a phosphatization of said one of said surfaces.

4. The hinge assembly defined in claim 1 wherein said one of said surfaces is roughened before application of said lacquer thereto and the lacquer is applied to the roughened surface.

5. The hinge assembly defined in claim 4 wherein said one of said surfaces has a surface roughness depth $R_a$~0.5 $\mu$m.

6. The hinge assembly defined in claim 1 wherein said carrier or binder contains substantially 15 to 30 volume percent molybdenum disulfide.

7. The hinge assembly defined in claim 1 wherein said carrier or binder contains 3 to 20 volume percent graphite.

8. The hinge assembly defined in claim 1 wherein said carrier or binder contains 20 to 25 volume percent molybdenum disulfide and 4 to 6 volume percent graphite.

9. The hinge assembly defined in claim 1 wherein said bearing lacquer is burned onto said one of said surfaces.

10. The hinge assembly defined in claim 9 whereein the bearing lacquer is burned onto said one of said surfaces at a temperature of about 200° C. for a duration of about 1 hour.

11. The hinge assembly defined in claim 1 wherein the lacquer has a thickness of 10 to 20 $\mu$m.

12. The hinge assembly defined in claim 1 wherein the lacquer is applied to said one of said surfaces in a plurality of layers each of a thickness of 7 to 10 $\mu$m.

13. The hinge assembly defined in claim 12 wherein the lacquer is applied to said one of said surfaces in two layers.

14. The hinge assembly defined in claim 1 wherein said additive contains at least one compound selected from the group which consists of crystalline molybdenum hydroxide monohydrate and molybdenum oxide dihydrate of the formula $MoOO_3 \cdot nH_2O$, where n=1 or 2 and compounds of said formula wherein a part of the $H_2O$ molecules are octahedrally coordinated in layers of $\{MoOO_{4/2}(OH_2)\}_n$, and compounds containing ilsemannite $Mo_3O_8 \cdot xH_2O$.

15. The hinge assembly defined in claim 14 wherein the lacquer contains substoichiometric molybdenum oxide forming Magnéli phases of the formula $Mo_nO_{3n-1}$ where n>4 with defects in the (102) or (103) crystal planes.

16. The hinge assembly defined in claim 1 wherein:

said carrier or binder has a molecular structure with alternating amide and imide monomers;

said one of said surfaces is provided with a primer to said lacquer is applied;

said one of said surfaces is roughened before application of said lacquer thereto and the lacquer is applied to the roughened surface;

said carrier or binder contains substantially 15 to 30 volume percent molybdenum disulfide and 3 to 20 volume percent graphite;

said bearing lacquer is burned onto said one of said surfaces; and the lacquer has a thickness of 10 to 20 $\mu$m.

17. The hinge assembly defined in claim 16 wherein the lacquer is applied to both of said surfaces in respective coatings.

18. The hinge assembly defined in claim 17 wherein said additive contains at least one compound selected from the group which consists of crystalline molybdenum hydroxide monohydrate and molybdenum oxide dihydrate of the formula $MoOO_3 \cdot nH_2O$, where n=1 or 2 and compounds of said formula wherein a part of the $H_2O$ molecules are octahedrally coordinated in layers of $\{MoOO_{4/2}(OH_2)\}_n$, and compounds containing ilsemannite $Mo_3O_8 \cdot xH_2O$.

19. A method of reducing wear in a hinge assembly for a tracked vehicle or a conveyor comprising a sleeve, a pin traversing said sleeve and respective bodies articulated together by said pin and said sleeve and respectively mounted on the pin and the sleeve, said pin extending axially beyond said sleeve and said bodies including an outer body pressed onto an end of said pin projecting beyond said sleeve and an inner body pressed onto said sleeve, said pin having an outer surface juxtaposed with an inner surface of said sleeve and adapted to contact said inner surface at least over portions of said inner and outer surfaces during mutual articulation of said bodies, which comprises applying to at least one of said surfaces at least over said portion thereof a coating of a bearing lacquer composed essentially of a synthetic resin carrier or binder with a molecular structure containing amide and imide monomers, and an additive contained therein and selected from the group which consists of molybdenum disulfide, oxides and hydroxide compounds of molybdenum, mixtures thereof, and mixtures thereof with graphite.

* * * * *